(12) United States Patent
Perotti et al.

(10) Patent No.: US 8,490,359 B2
(45) Date of Patent: Jul. 23, 2013

(54) LANDSCAPE EDGING BLOCK SYSTEM

(76) Inventors: Joan M. Perotti, Hamburg, NJ (US); Mark C. Schmidt, Flanders, NJ (US)

( * ) Notice: Subject to any disclaimer, the term of this patent is extended or adjusted under 35 U.S.C. 154(b) by 41 days.

(21) Appl. No.: 13/204,477

(22) Filed: Aug. 5, 2011

(65) Prior Publication Data

US 2013/0031848 A1 Feb. 7, 2013

(51) Int. Cl.
*E04B 2/08* (2006.01)

(52) U.S. Cl.
USPC ............. 52/589.1; 52/102; 52/604; 403/364; 47/33; 404/34; 405/286

(58) Field of Classification Search
USPC ............ 52/102, 578, 579, 589.1, 581, 588.1, 52/590.1, 591.1, 592.5, 596, 598, 599, 604, 52/608–611, 561, 568–570, 572, 566–567; 47/33, 66.1, 66.6, 32, 32.4, 32.7, 9; 404/7, 404/8, 34; 446/124, 125, 85, 106, 120, 121; 403/345, 361, 364, 381, 382, 205; 405/286
See application file for complete search history.

(56) References Cited

U.S. PATENT DOCUMENTS

| | | |
|---|---|---|
| 2,727,737 A | 12/1955 | Dole |
| 3,759,043 A | 9/1973 | Tokunaga |
| 4,277,921 A | 7/1981 | Gianfranco |
| 4,426,176 A | 1/1984 | Terada |
| 4,969,289 A | 11/1990 | Trifiletti |
| D315,026 S | 2/1991 | Castonguay et al. |
| D322,859 S | 12/1991 | Wurth et al. |
| 5,134,817 A | 8/1992 | Richardt |
| 5,157,867 A | 10/1992 | Fritch |
| 5,215,490 A * | 6/1993 | Szoradi .................. 446/115 |
| 5,414,956 A | 5/1995 | Kheradpir |
| D361,853 S | 8/1995 | Northrop |
| 5,437,127 A | 8/1995 | Ha |
| 5,445,362 A | 8/1995 | Reppert |
| 5,452,541 A | 9/1995 | DeMaio |
| D363,801 S | 10/1995 | Nauseda |
| 5,568,994 A | 10/1996 | Dawson |
| D378,857 S | 4/1997 | Hale |
| 5,720,128 A | 2/1998 | Smith et al. |

(Continued)

FOREIGN PATENT DOCUMENTS

| | | |
|---|---|---|
| BE | 1012360 A6 | 10/2006 |
| DE | 198 48 320 A1 | 5/2000 |
| EP | 0 898 876 A1 | 3/1999 |

OTHER PUBLICATIONS

International Search Report and Written Opinion issued by the European Patent Office in related International Application No. PCT/US2007/000761, Jun. 29, 2007; EPO, Rijswijk, NL.

*Primary Examiner* — Brian Glessner
*Assistant Examiner* — Beth Stephan
(74) *Attorney, Agent, or Firm* — Buchanan Ingersoll & Rooney PC

(57) ABSTRACT

An assembly of blocks for use in yard and garden environments includes a plurality of discrete blocks each having a body portion and a joining portion, the joining portion having a plurality of angled teeth. The teeth of a first one of the plurality of blocks interlock with the teeth of a second one of the plurality of blocks such that the first and second blocks are connected together and arranged perpendicular relative to one another so that the plurality of blocks has an L-shaped configuration.

23 Claims, 12 Drawing Sheets

U.S. PATENT DOCUMENTS

| | | | |
|---|---|---|---|
| 5,746,038 A * | 5/1998 | Houk | 52/590.1 |
| D407,507 S | 3/1999 | Owens, II et al. | |
| 6,109,329 A * | 8/2000 | Russo | 160/135 |
| D439,677 S | 3/2001 | Mattox | |
| D457,973 S | 5/2002 | Conde | |
| 6,508,041 B1 * | 1/2003 | Boot | 52/578 |
| 6,539,684 B1 | 4/2003 | Graham | |
| 6,591,547 B1 | 7/2003 | Staten et al. | |
| 6,594,959 B2 | 7/2003 | Whitson | |
| 6,944,998 B1 * | 9/2005 | King | 52/314 |
| 7,125,255 B2 * | 10/2006 | Queen | 434/156 |
| 7,159,367 B1 * | 1/2007 | King | 52/314 |
| 7,770,340 B2 * | 8/2010 | Heady et al. | 52/107 |
| 7,887,249 B2 * | 2/2011 | Schmitz | 403/364 |
| 8,291,669 B2 * | 10/2012 | Karau | 52/609 |
| 2002/0078636 A1 | 6/2002 | Whitson | |
| 2002/0083657 A1 | 7/2002 | Mattox et al. | |
| 2002/0112399 A1 | 8/2002 | Riccobene | |
| 2009/0298382 A1 * | 12/2009 | Ochi | 446/121 |

* cited by examiner

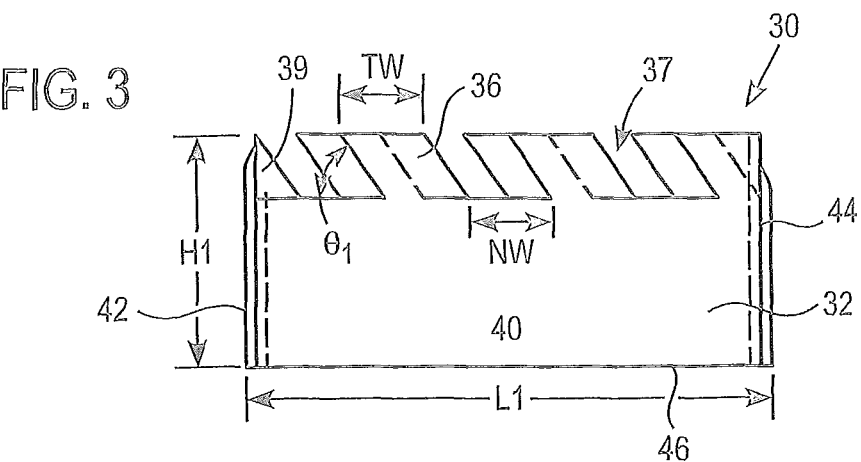
FIG. 3
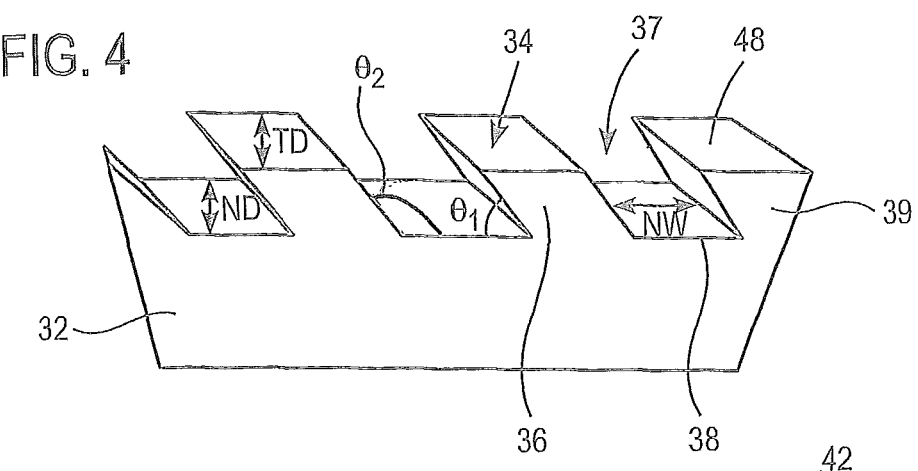
FIG. 4
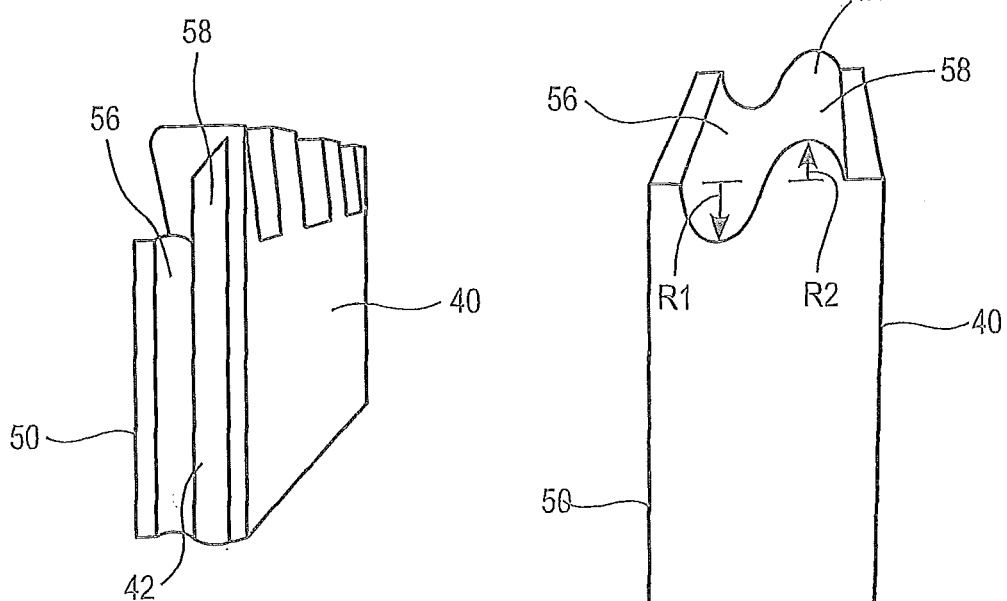
FIG. 5
FIG. 6

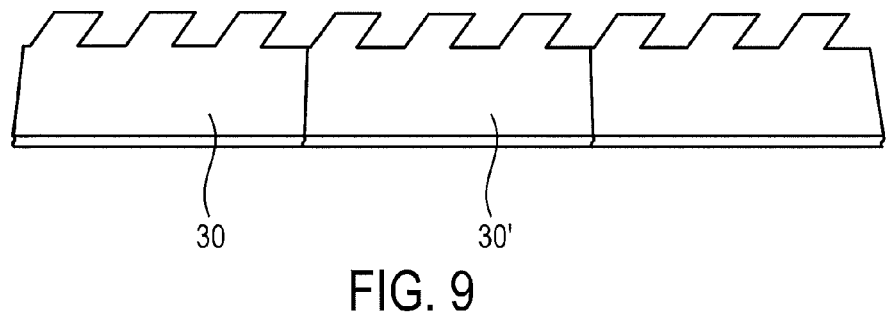
FIG. 9
FIG. 10
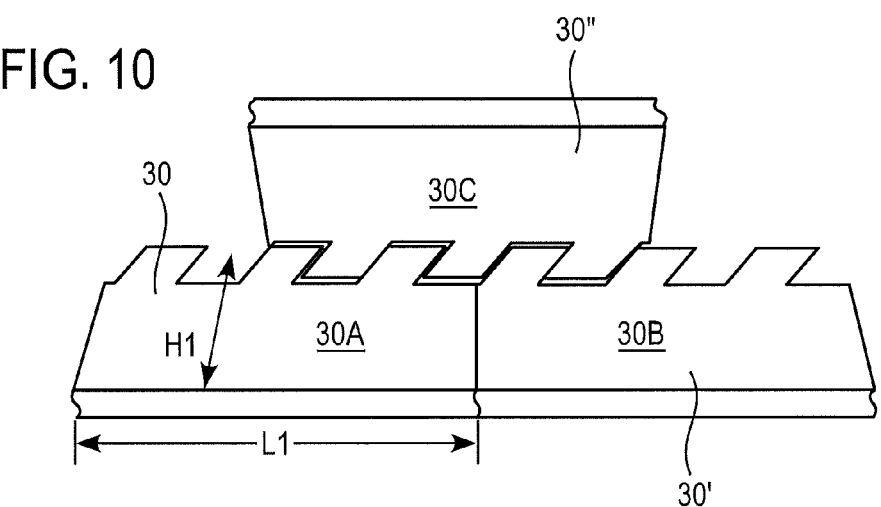
FIG. 11
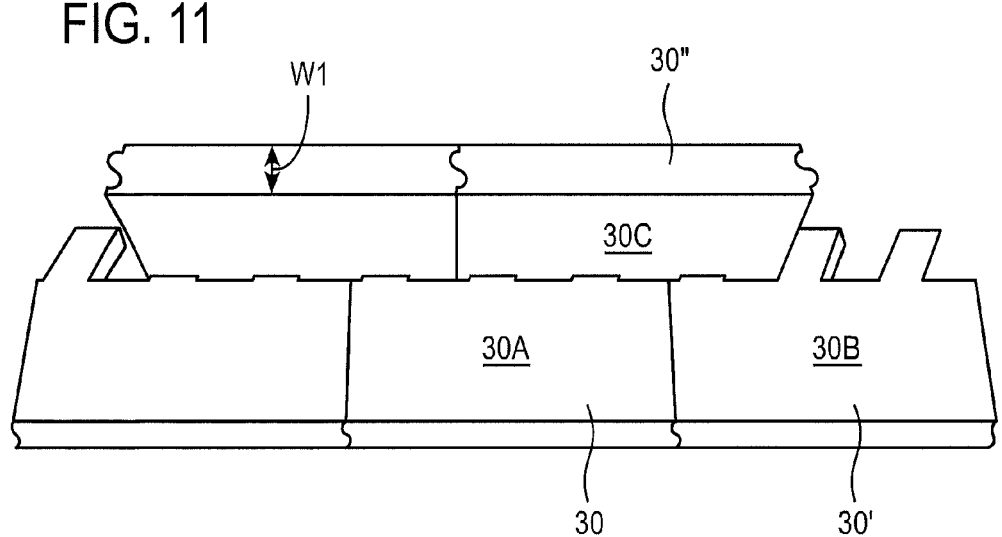

LANDSCAPE EDGING BLOCK SYSTEM

TECHNICAL FIELD

The present invention relates generally to systems and devices used in landscaping and other related applications. More particularly, the invention pertains to systems and devices which can be used for defining a border in a landscape area, a patio, framing for a patio, walkway, garden, and/or any other similar applications.

BACKGROUND DISCUSSION

The landscaping of homes and commercial properties typically includes numerous elements such as grass, trees, and sidewalks. The maintenance of defined borders between these different landscape elements presents a problem because many of the elements, such as grass and flowers, are constantly growing and encroach upon other areas of the landscape. For example, when grass is growing adjacent to a sidewalk, the grass often grows over the surface edge of the sidewalk making it unsightly and difficult to cut. Grass planted adjacent to fences or mulched areas may also appear unsightly as it grows into mulched areas or up fences. Grass that grows into other areas is difficult to maintain in that it requires an edging device such as a gasoline-powered edger in addition to the lawnmower conventionally used to cut the grass.

One device known in the art for creating a border between different landscape elements is a scalloped block such as the one shown in FIG. 1. The scalloped edging block 10 shown in FIG. 1 is typically made of concrete and is placed along the border of a lawn to prevent grass from encroaching into an enjoining area. Although this block 10 is successful in preventing grass from growing into adjacent landscape areas, for example preventing grass from growing into a flower bed, this device presents problems for the maintenance of a lawn because grass that grows close to the side of the block 10 cannot be cut with a conventional lawnmower as depicted in FIG. 2. When a lawnmower 20 is operated next to the scalloped block 10, the wheel of the lawnmower 20 will run over the grass 22 growing next to the block 10 and the blade of the lawnmower 20 will not extend far enough towards the block 10 to cut the grass 22 growing immediately adjacent to the block. Thus, another tool such as a landscape edging tool must be used to trim the grass growing adjacent to the block after the lawnmower has passed. This additional landscaping step is tedious and time consuming, especially in large landscaped areas. In addition, the blocks 10 depicted in FIGS. 1-2 tend to fall over if contacted with a lawnmower 20, requiring the landscaper to go back and reset the blocks after mowing the lawn.

Another attempted solution to this problem is shown in U.S. Pat. No. 5,452,541 to DeMaio. DeMaio discloses a plant growth prevention apparatus that provides a barrier between a lawn and a tree. The apparatus taught in DeMaio consists of a number of modules which fit together using connecting rod assemblies. Rods are also used to anchor the apparatus to the ground to prevent it from moving. The object of the apparatus disclosed in DeMaio is to allow grass to be cut using a traditional lawnmower without the need for an edging device as shown in FIG. 1 of DeMaio. Although the apparatus disclosed in DeMaio prevents grass from growing directly adjacent to trees, the apparatus in DeMaio still presents two problems: the lawnmower operates on a slant to the ground which results in a slanted cut to the grass as depicted in FIG. 1, and the apparatus in DeMaio is difficult to assemble because it requires a plurality of connectors.

Yet another attempted solution to the problem described above is disclosed in U.S. Pat. No. 6,594,959 to Whitson. Whitson discloses a masonry edging block for providing a border to a landscape area. Although the edging block disclosed in Whitson prevents the growth of grass along the border of a landscape area, the assembly in Whitson requires the use of dowels to connect the different blocks that make up the edger assembly. This provides for an awkward and arduous assembly process.

A vast improvement over the above-noted edging blocks is the landscape block disclosed in U.S. Pat. No. 7,536,825 to Perotti, the entire contents of which are hereby incorporated by reference. Perotti discloses an L-shaped block that can be arranged in interlocking fashion to create the desired border between different landscape elements. The L-shaped block is successful in overcoming the need for a separate edging step when mowing the lawn. The L-shaped block, however, is also generally made of concrete and thus creates certain drawbacks in handling and transportation due to its size and weight.

Thus, there remains a need for a system and a device which provides an esthetically pleasing border for landscape areas and the like, which is easy for a consumer to manipulate and assemble, and which requires minimal maintenance.

SUMMARY

According to one aspect, an assembly of blocks for use in yard and garden environments comprising a plurality of discrete blocks each comprising a body portion and a joining portion, said joining portion comprising a plurality of angled teeth; wherein said teeth of a first one of said plurality of blocks interlock with said teeth of a second one of said plurality of blocks such that said first and second blocks are connected together and arranged perpendicular relative to one another so that the plurality of blocks form an L-shaped configuration.

According to another aspect, a method of assembling a plurality of blocks in a ground setting, comprises providing a plurality of blocks, each of the blocks comprising a body portion and a joining portion, said joining portion comprising a plurality of angled teeth, each said block further including a first side edge and a second side edge, said first side edge having a first recess portion and a first projection, said second side edge having a second recess portion and a second projection; positioning a first plurality of said blocks on the ground such that said first side edge of one of said plurality of blocks interlocks with said second side edge of another one of said plurality of blocks such that said blocks are connected together and arranged coplanar relative to one another; and positioning a second plurality of said blocks perpendicular to said first plurality of blocks on the grounds such that said teeth of one of said second plurality of blocks interlock with said teeth of one of said first plurality of blocks such that said blocks are connected together and arranged perpendicular relative to one another.

According to another aspect, an assembly of blocks for use in yard and garden environments comprises a plurality of discrete blocks each comprising a first member and a second member, said first member including a plurality of openings and said second member including a plurality of projections; wherein said projections of said second member interlock with said openings of said first member such that said first and second members are connected together and arranged perpendicular relative to one another.

BRIEF DESCRIPTION OF THE DRAWINGS

These and other aspects, features, and advantages of the present invention will become more readily apparent to those skilled in the art upon reading the following detailed description, in conjunction with the appended drawings.

FIG. 3 is a front view of one embodiment of a block as disclosed herein.

FIG. 4 is a top perspective view of the block depicted in FIG. 3.

FIG. 5 is a left end view of the block depicted in FIG. 3.

FIG. 6 is a bottom, left end perspective view of the block depicted in FIG. 3.

FIG. 9 is a top view of a plurality of edging blocks according to one embodiment arranged adjacent to each other.

FIG. 10 is a perspective view of a plurality of base blocks and a top block being disposed thereon.

FIG. 11 is a perspective view of a plurality of blocks according to one embodiment arranged in interfitting fashion to form a landscape border.

DETAILED DESCRIPTION

Figure 1:
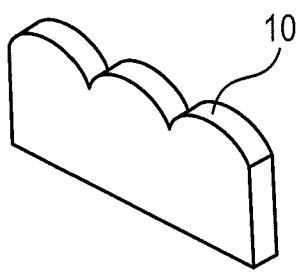
FIG. 1 is a perspective view of a prior art landscaping block commonly known in the art.
Figure 2:
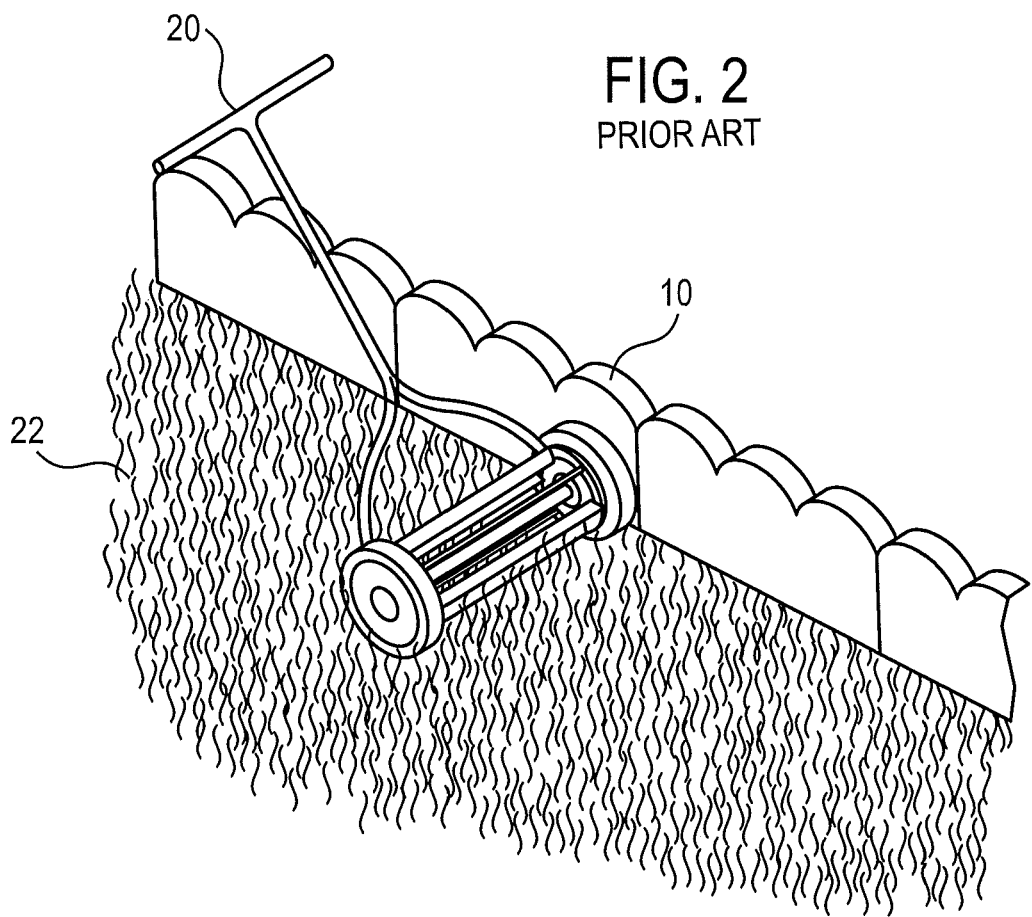
FIG. 2 is view of a plurality of the blocks depicted in FIG. 1 arranged to form a landscape border.

A preferred embodiment of a landscape edging block and system according to the invention will now be described with reference to the figures.

FIG. 3 depicts a single block 30 according to one embodiment of the present invention. The block 30 comprises a body portion 32 and a joining portion 34.

Joining portion 34 preferably comprises, according to the illustrated embodiment, a plurality of angled teeth 36 projecting from a longitudinal edge 38 of the body portion 32. As shown in FIGS. 3 and 4, each tooth 36 is defined by providing a plurality of notches 37, preferably three, in the joining portion 34 of the block 30. Each notch 37 is angled by an angle $\theta_1$ relative to the z-axis, where $\theta_1$ is preferably between 45 degrees and 65 degrees, and most preferably $\theta_1$ is approximately 55 degrees (See also, FIG. 8A). In addition, each notch 37 is angled by an angle $\theta_2$ relative to the horizontal axis, wherein $\theta_2$ is preferably between 115 degrees and 135 degrees, and most preferably $\theta_2$ is approximately 125 degrees. Each notch 37 preferably has a notch width NW of 2 inches and a notch depth ND of 1.5 inches. Each tooth 36 defined by the notches 37 thus has a corresponding preferred tooth width TW of 2 inches and a tooth depth TD of 1.5 inches. The notches 37 are preferably positioned relative to the longitudinal edge 38 of the body portion 32 to be centered thereon, that is, there is space 39 of approximately 1 inch along each end of longitudinal edge 38 prior to the formation a notch 37. The above angles and dimensions are of course only representative of one possible embodiment and different angles and dimensions can be utilized to also obtain a satisfactory result.

The block 30 is generally rectangular and has a front surface 40, a first side surface 42 (the left side edge as illustrated in FIG. 3) and a second side surface 44 (the right side edge as illustrated in FIG. 3). The block 30 also has a bottom surface 46, a top surface 48 defined by a horizontal plane along the top of each tooth 36, and a rear surface 50. In one embodiment, as shown, top surface 48 defines a flat surface.

Figure 7:
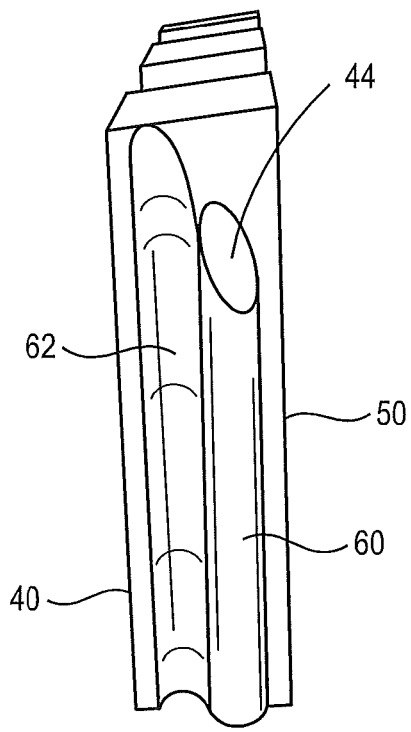
FIG. 7 is a right end view of the block depicted in FIG. 3.
Figure 8:
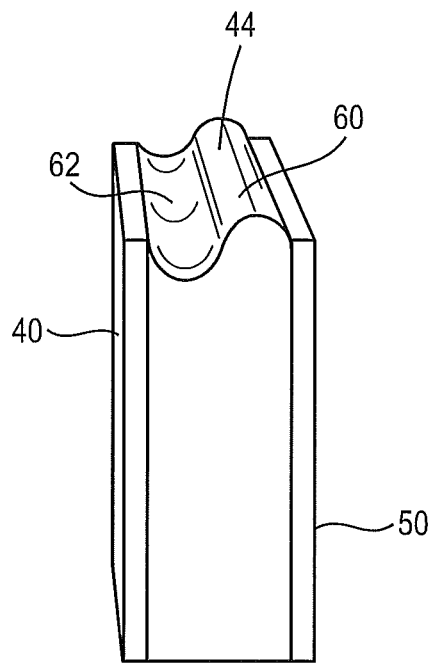
FIG. 8 is a bottom, right end perspective view of the block depicted in FIG. 3.
Figure 8A:
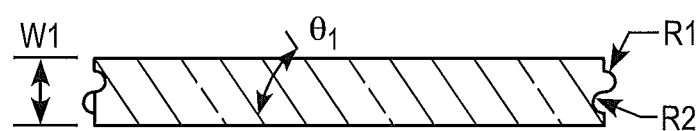
FIG. 8A is a cross section through the block depicted in FIG. 3.

Referring also to FIGS. 5-8A, the opposing side edges 42, 44 of the block 30 are illustrated. FIGS. 5-6 disclose the left or first side edge 42 having a recess or concave portion 56 adjoining a projection or convex portion 58. The radius of curvature R1 of the concave portion 56 is the same as the radius of curvature R2 of the convex portion 58. The right or second side edge 44 of the block 30 is an inverse mirror image of the left side edge. More particularly, as shown in FIGS. 7-8A, the right side edge 44 has a projection or convex portion 60 adjoining a recess or concave portion 62. In a preferred embodiment, the projection 60 and recess 62 have a radius R1 and R2, respectively, of 0.25 inches, as shown in FIG. 8A.

Thus, referring also to FIG. 9, when the right side edge of block 30 and the left side edge of an identical block 30' are positioned in an adjoining configuration, the convex portion 60 of block 30 engages and contacts the concave portion 56 of adjacent block 30' and the concave portion 62 of block 30 engages and contacts the convex portion 58 of adjacent block 30', thereby securing the adjacent blocks 30, 30'. The projections and correspondingly shaped recesses provide a side edge engagement mechanism between adjacent blocks that provides a positive interengagement between adjacent blocks. Of course, it is to be understood that other types of engagement mechanisms can be employed, for example multiple projections on one side surface that engage corresponding multiple recesses on the facing side surface of the adjacent block, or curved side surfaces on the adjacent blocks that engage one another.

A plurality of blocks 30 can thus be assembled to form a landscape edging block system according to one embodiment of the invention. As shown in FIGS. 9-13, a first block 30 is disposed in a planar configuration parallel to the ground surface to form a base member 30A that is intended to be installed in the ground surface. A second block 30' is also disposed in a planar configuration adjoining block 30 and forms a base member 30B. (The system for the side edge engagement of block 30 and block 30' is described in detail above.) Referring to FIGS. 10-11, a third block 30" is disposed in an inverted, vertical configuration relative to blocks 30 and 30' such that the teeth 36 of block 30" engage and interlock with the teeth 36 of blocks 30 and 30'. As shown in the illustrated embodiment, block 30" is aligned between blocks 30 and 30' in order to further secure the blocks together. In the illustrated embodiment, block 30" is identical to blocks 30, 30'. Block 30" defines a top member 30C for the landscape block system but, as discussed in detail below, does not necessarily have to be identical to the blocks forming the base members 30A, 30B. In terms of U.S. Pat. No. 7,536,825 to Perotti, block 30C defines the disclosed first member and blocks 30A and 30B define the disclosed second member, with the length of the second member being twice the length of the first member. That is, the assembled blocks have a 2:1 relationship between the base members and the top member.

In certain preferred embodiments, block 30 has a length L1 of 12 inches, a width W1 of 1.5 inches, and a height H1 of 5.5 inches and blocks 30', 30" would preferably have the same dimensions. One skilled in the art would recognize that various sizes of landscaping blocks may be made according to the present invention for various different applications. For example, a landscape designer may create interlocking edging blocks according to the invention wherein the block has a length of only 6 inches, or smaller, for small applications such as creating a decorative edge around a flower bed, or the blocks can be very large if needed for industrial applications.

Figure 12:
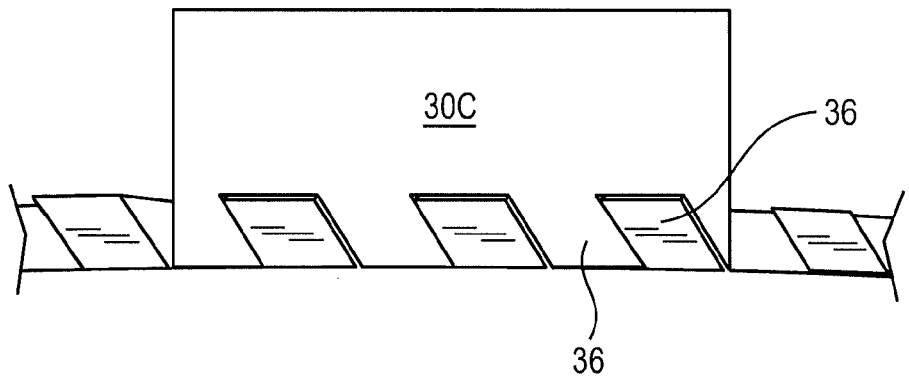
FIG. 12 is a rear view of the interfitting blocks shown in FIG. 11.
Figure 13:
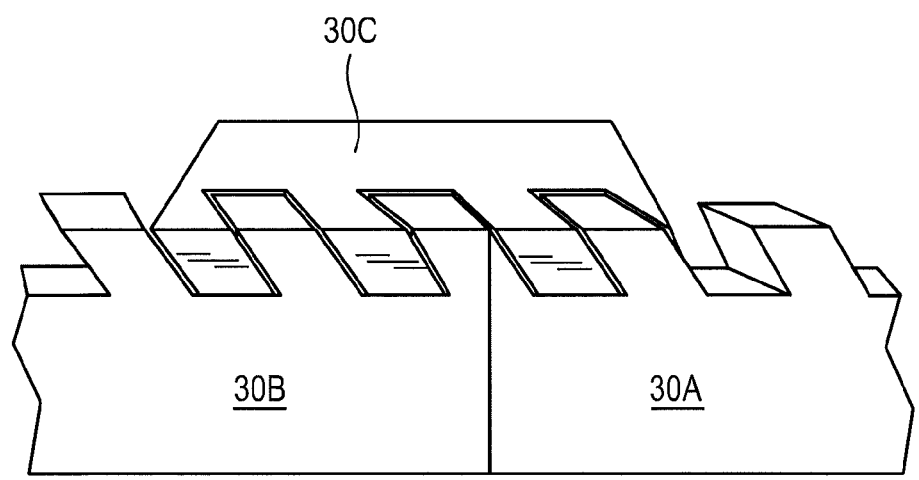
FIG. 13 is a bottom view of the interfitting blocks shown in FIG. 11.

In a preferred embodiment, block 30, 30', as depicted in FIGS. 9-13, is positioned with the rear surface 50 parallel to the ground and block 30" is positioned perpendicular thereto, i.e., the teeth 36 are positioned toward the ground. FIG. 10 depicts three landscape blocks 30A, 30B, and 30C aligned in adjoining fashion in a row to form a landscape border. The teeth 36 of blocks 30A, 30B, and 30C interlock with each other, as shown in FIGS. 12 and 13, to form a barrier to be placed between two areas of landscaping, such as a lawn and a sidewalk. Thus, only a single block design is needed to form the interlocking row depicted in FIG. 11. This reduces the costs and burden of purchasing numerous elements for creation of a landscape border. In addition, due to the relatively small size of the block, the weight is reduced such that manipulation and installation is less burdensome than with prior blocks. As depicted in FIG. 10, a first landscaping block 30A is arranged in a horizontal orientation. The second landscaping block 30B is arranged in a horizontal orientation and interfitted to block 30A by way of the side edge engagement mechanism discussed above. The third landscaping block 30C is arranged in a vertical orientation and interfitted by way of the complementary teeth 36. This arrangement creates a uniform border which is aesthetically pleasing.

Figure 14:
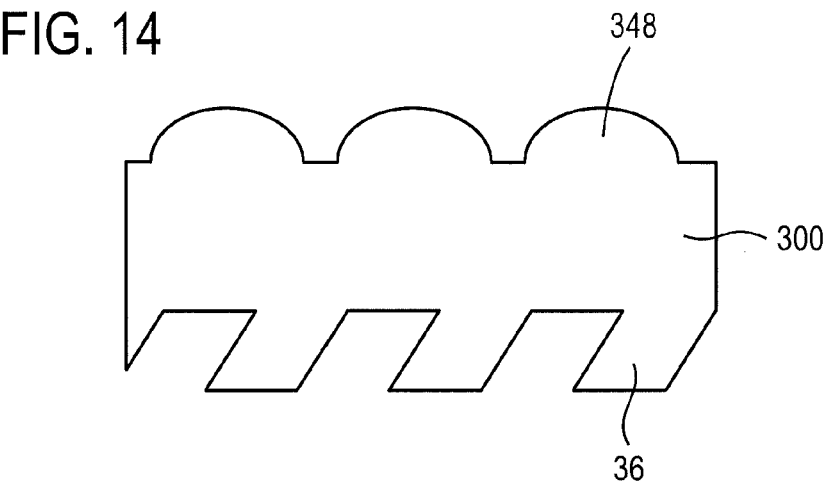
FIG. 14 is a front view of a further embodiment of a block as disclosed herein.
Figure 15:
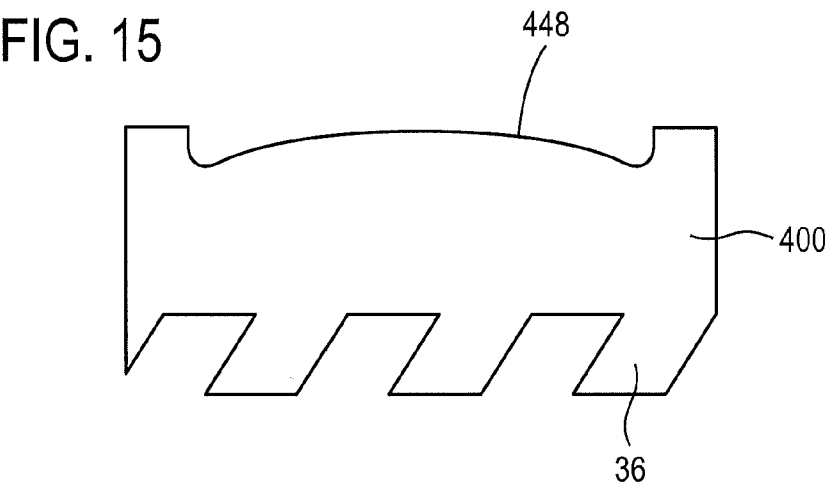
FIG. 15 is a front view of a further embodiment of a block as disclosed herein.
Figure 16:
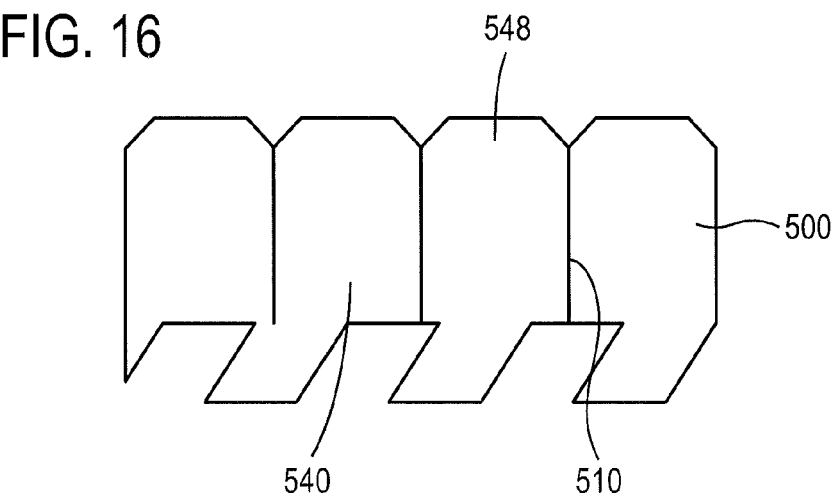
FIG. 16 is a front view of a still further embodiment of a block as disclosed herein.
Figure 17:
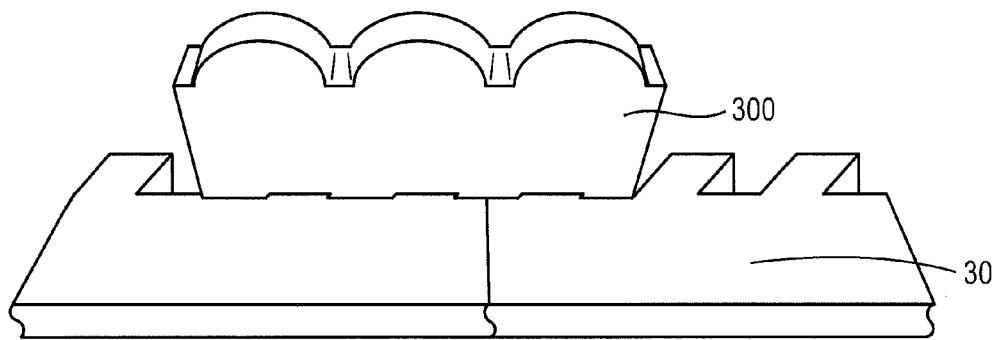
FIG. 17 is a perspective view of a plurality of blocks according to one embodiment as disclosed herein.
Figure 18:
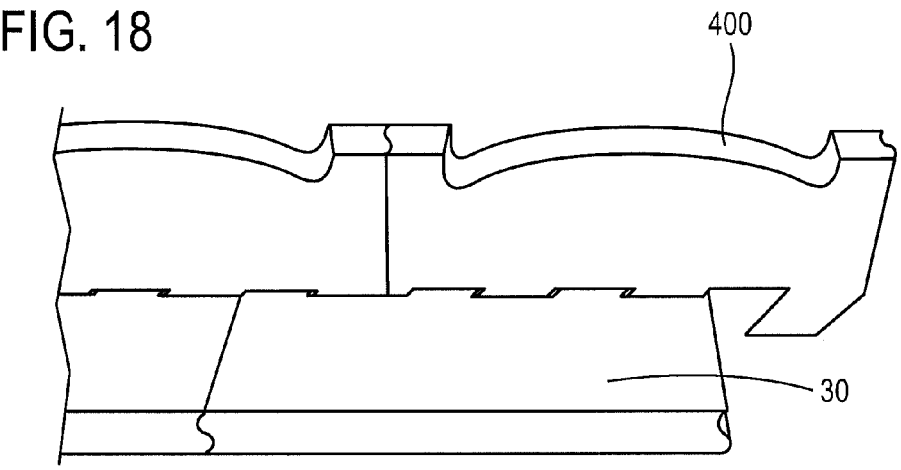
FIG. 18 is a perspective view of a plurality of blocks according to one embodiment as disclosed herein.
Figure 19:
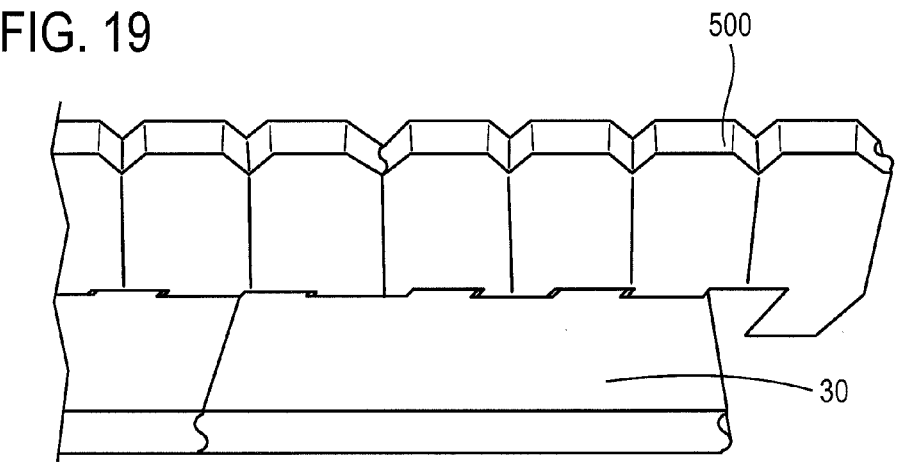
FIG. 19 is a perspective view of a plurality of blocks according to one embodiment as disclosed herein.

Alternate designs of the landscape block according to further embodiments of the invention are shown in FIGS. 14-19. FIGS. 14 and 17, for example, depicts a block 300 preferably intended to be an alternative to the vertically aligned top member block 30C shown in FIG. 10. Block 300 is configured identical to block 30 in order to provide interlocking capabilities with the base member blocks 30A, 30B, but instead of having a flat top surface 48, block 300 provides a scalloped top surface 348. A further embodiment is alternative block 400 shown in FIGS. 15 and 18 disclosing a portico shaped top surface 448. Further still, FIGS. 16 and 19 illustrate an embodiment of picket fence top surface 548 on block 500. Block 500 may also preferably include groove lines 510 along the front surface 540 and/or rear surface (not shown) to simulate the appearance of a picket fence. Although it is preferred to use decorative blocks 300, 400, 500 as only the top member of a block system and to utilize block 30 as the base member to provide a straight edge along the ground surface, it is of course possible to also position blocks 300, 400, 500 parallel to the ground as the base member and further, the choice of top members and base members can be mixed and/or matched as desired.

Figure 20:
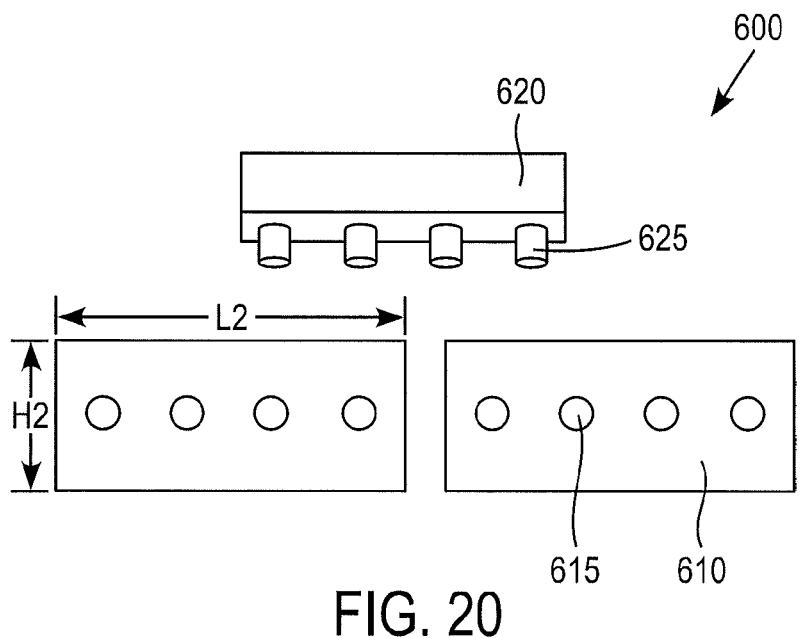
FIG. 20 is a perspective view of one embodiment of a block system as disclosed herein.
Figure 21:
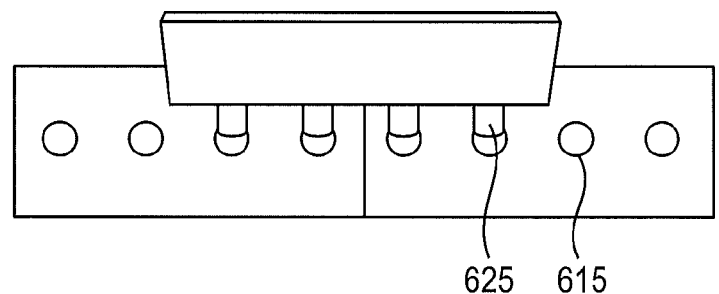
FIG. 21 is a perspective view of the block system of FIG. 20 arranged in an interfitting fashion to form a landscape border device.
Figure 22:
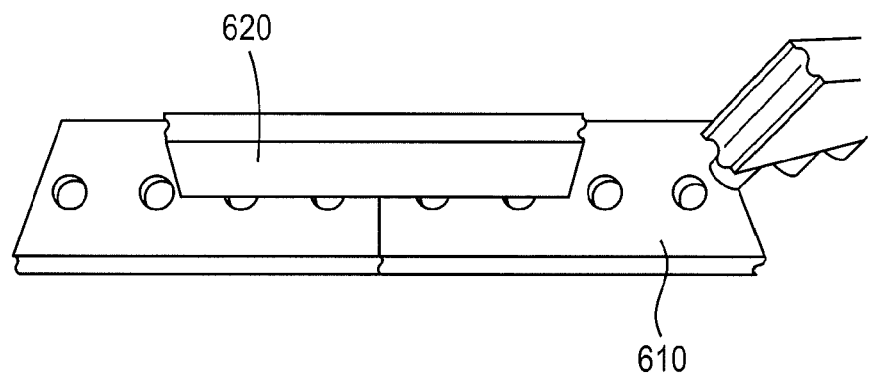
FIG. 22 is a perspective view of a plurality of block systems according to one embodiment arranged in an interfitting fashion to form a landscape border device.

A further embodiment of the landscape edging block and system according to the invention is disclosed in FIGS. 20-22.

Figure 29:
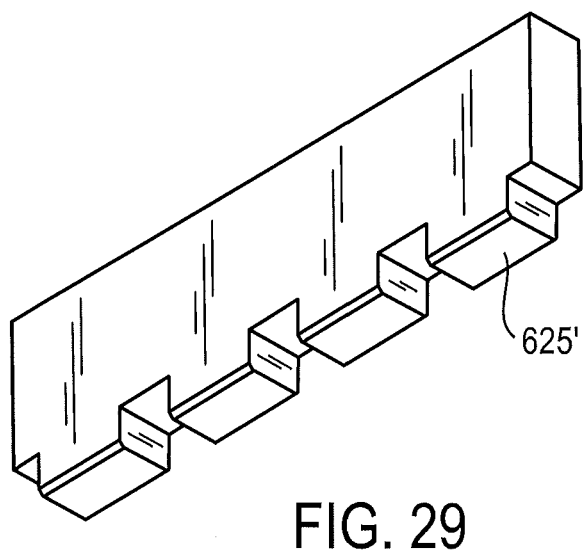
FIG. 29 is a perspective view of a further embodiment of a block for a block system as disclosed herein.
Figure 30:
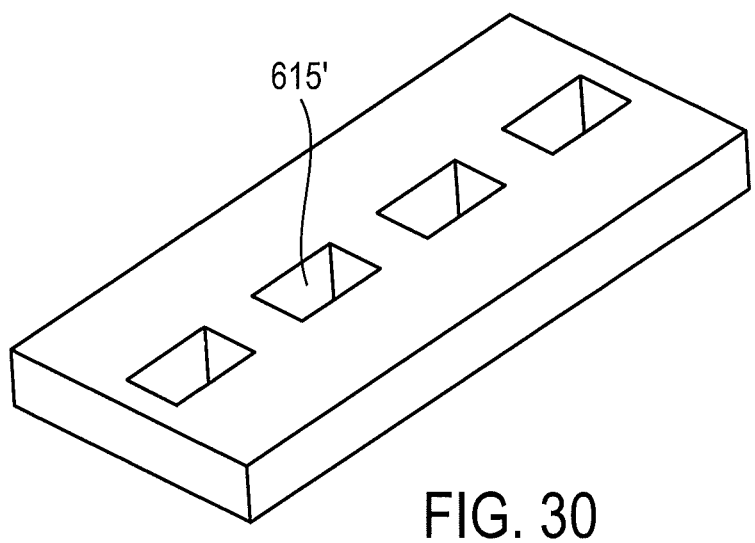
FIG. 30 is a perspective view of a further embodiment of a block for a block system as disclosed herein.

FIGS. 20-22 depict a block 600 according to one embodiment of the present invention. The block 600 comprises a base or first member 610 and a top or second member 620. The first member 610 includes a plurality of holes or openings 615 disposed therein, preferably equally spaced along a center longitudinal axis. In the illustrated embodiment, the openings 615 are circular in shape, but other shapes could of course also be used. The second member 620 includes a plurality of projecting pegs 625 corresponding in shape and size to the openings 615 in the first member 610. Although circular openings and pegs are shown, other shapes could of course also be used. For example, square or rectangular openings and pegs could be provided as shown in FIGS. 29-30, and in fact, the square or rectangular openings 615' and pegs 625' are preferred for blocks made of concrete.

In certain preferred embodiments, first member and second member 610, 620 have a length L2 of 16 inches, a width W2 of 2 inches, and a height H2 of 8 inches which closely correspond to known industry standard landscaping blocks. Alternatively though, the first and second members 610, 620 of block 600 may have any dimensions desired depending upon the particular installation to which it is going to be applied.

Still further, while second member 620 is illustrated with a flat top surface similar to the embodiment shown for block 30, it will be appreciated by one skilled in the art that second member 620 may also have varying decorative designs, such as for example, the scallop top of block 300, the portico top of block 400, the picket fence top of block 500, a modified scallop top or any other decorative and aesthetically pleasing design. Also similar to the above embodiments of FIGS. 3-19, the choice of top members and base members can be mixed and/or matched as desired.

Figure 23:
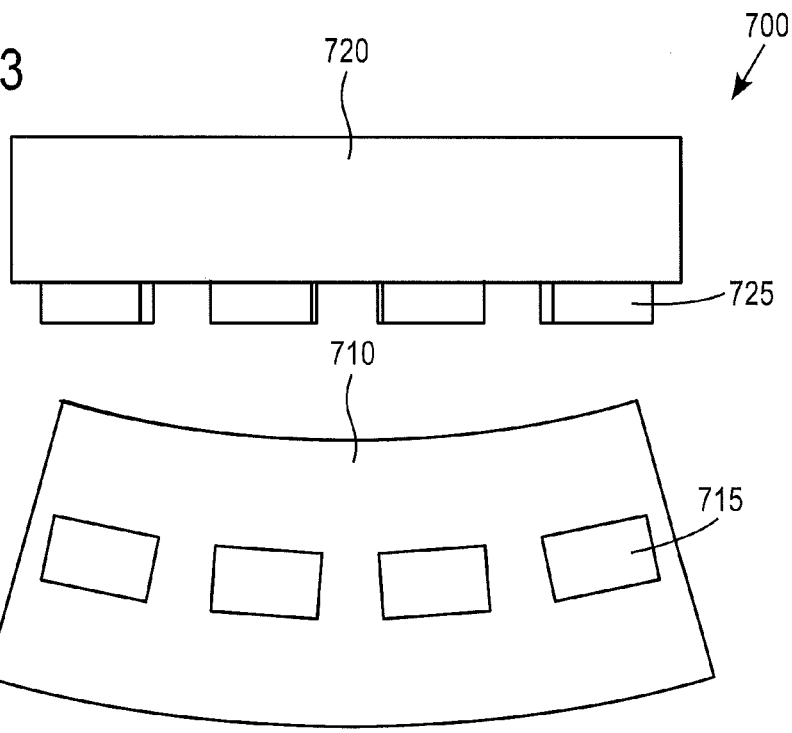
FIG. 23 is a schematic view of one embodiment of a block system as disclosed herein.
Figure 24:
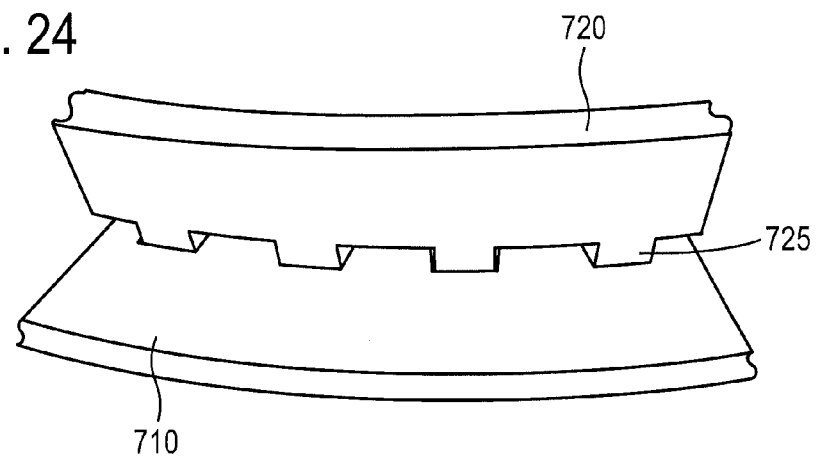
FIG. 24 is a perspective view of one embodiment of a block system as disclosed herein with the blocks being arranged adjacent to each other.
Figure 25:
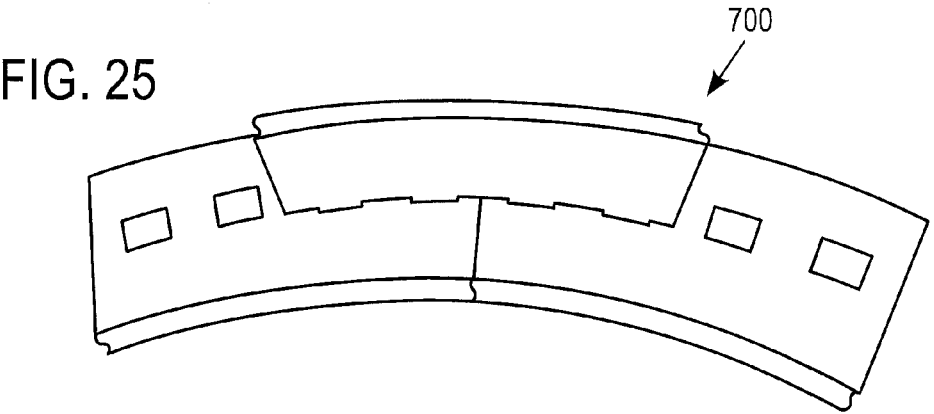
FIG. 25 is a perspective view of one embodiment of a block system as disclosed herein arranged in an interfitting fashion to form a landscape border.
Figure 26:
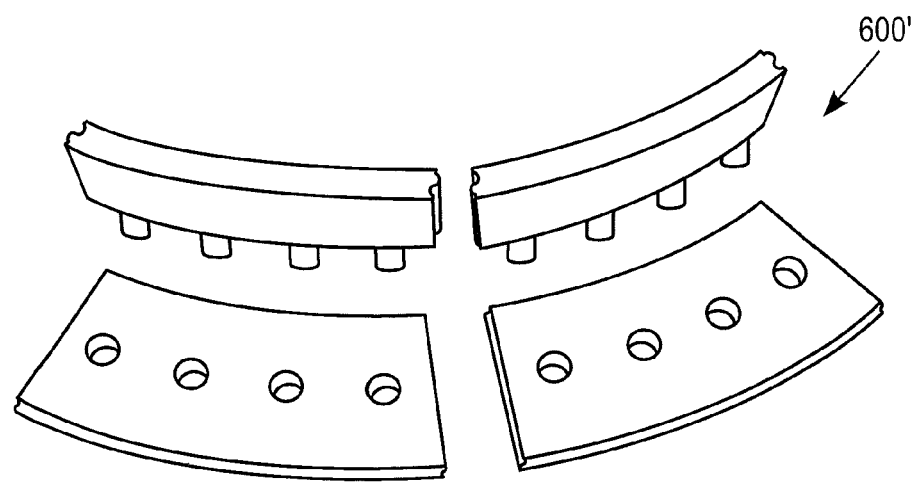
FIG. 26 is a perspective view of a block system according to one embodiment as disclosed herein.
Figure 27:
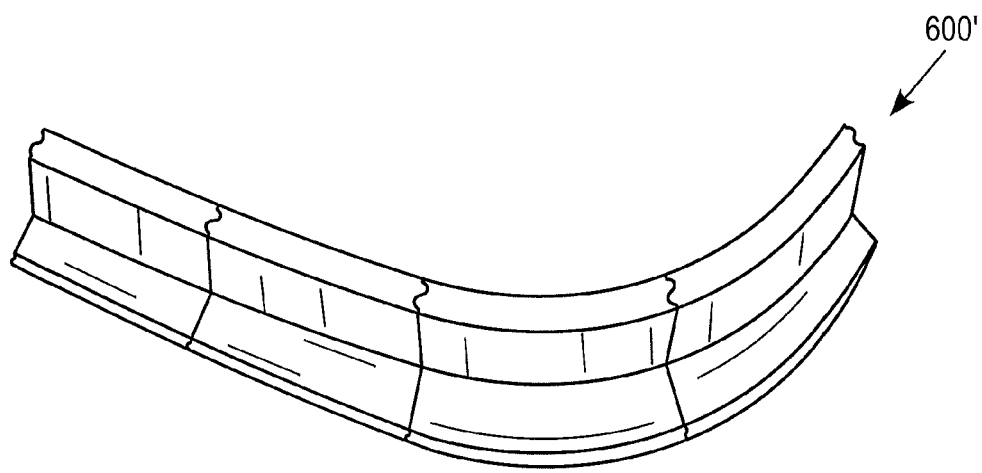
FIG. 27 is a perspective view of a plurality of block systems according to one embodiment arranged in an interfitting fashion to form a curved landscape border device.

FIGS. 23-27 illustrate further embodiments of the invention wherein the block system is utilized to provide a curved or wave shaped landscape border. FIGS. 23-25 illustrate a block 700 according to one embodiment comprising a base or first member 710 and a top or second member 720. The first member 710 includes a plurality of holes or openings 715 disposed therein, preferably equally spaced along a center longitudinal axis. In the illustrated embodiment, the openings 715 are quadrilateral in shape, i.e., square or rectangle, but other shapes could of course also be used. The second member 720 includes a plurality of projecting pegs 725 corresponding in shape and size to the openings 715 in the first member 710. As shown, block 700 has an overall curvature which is useful in designing landscapes around patios, trees, and the like. FIGS. 26-27 illustrate a block 600', similar in most aspects to previously disclosed block 600 having circular openings and pegs, but having an overall curvature rather than a linear longitudinal axis.

Figure 28:
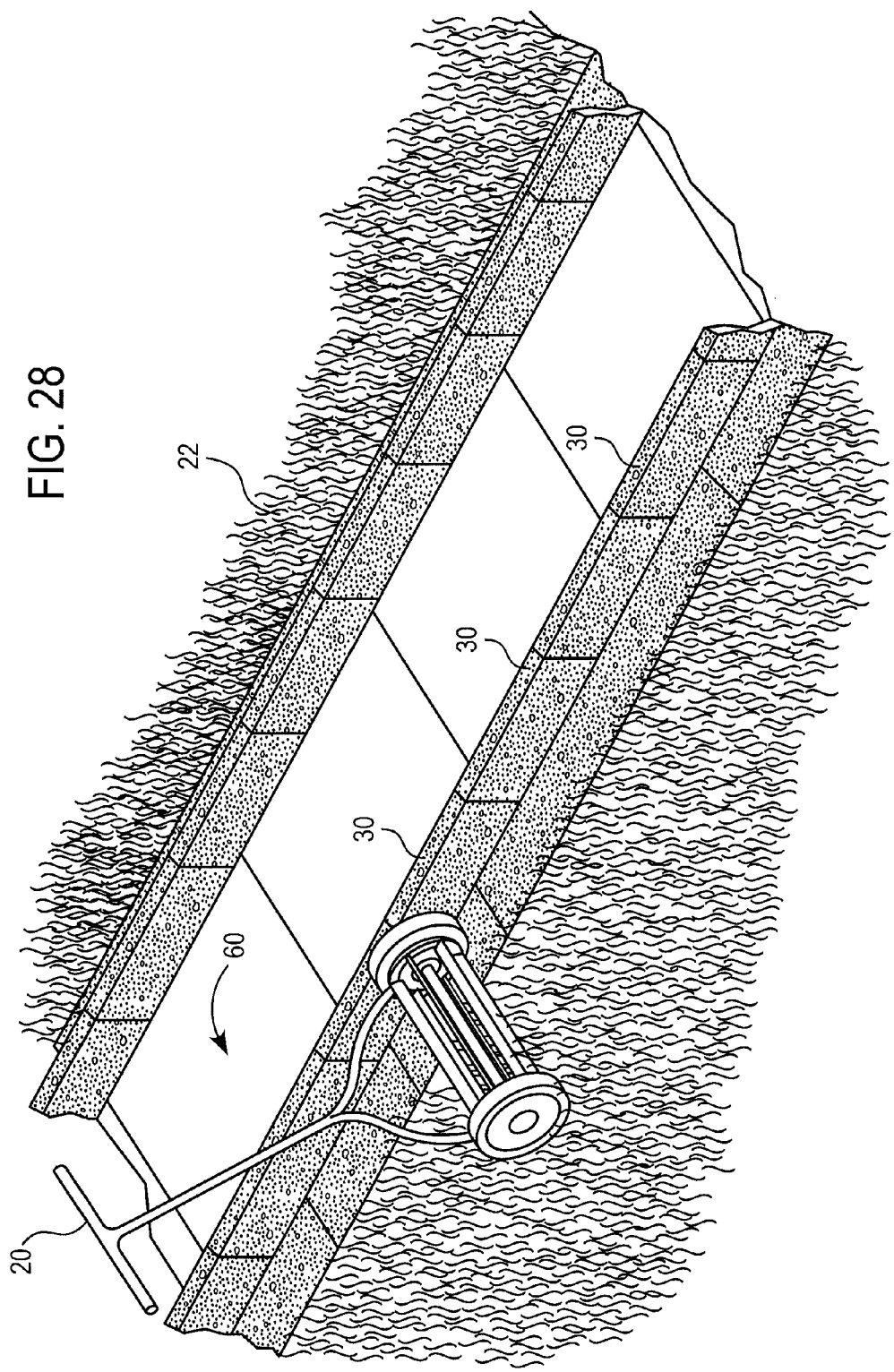
FIG. 28 is a perspective view of two landscaping borders formed from blocks according to one embodiment with a lawnmower trimming the grass area adjacent to the border.

FIG. 28 depicts a lawnmower 20 proceeding along the grass area 22 adjacent to a row of landscaping blocks 30 according to the invention. The lawnmower 20 is able to move with one wheel on the horizontally disposed blocks 30 in order to cut the grass 22 immediately adjacent to the landscaping blocks 30 in a neat and straight manner without leaving any blades of grass next to the blocks. Thus, the result is a well-groomed area of grass without having to move or rearrange and of the blocks and without having to trim next to the blocks with a garden trimmer.

Hence, as described in detail above, in order for the typical consumer to be able to more easily transport and assemble a landscaping block, the preferred invention herein creates a landscaping block that is assembled from multiple pieces, as demonstrated in FIGS. 10 and 21. When assembled, the separate pieces present a very similar appearance to the one-piece landscape block described in U.S. Pat. No. 7,536,825, but now afford ease of handling and transport as the overall size and weight of the landscape block has been reduced.

Landscaping blocks according the invention may be constructed of concrete, or another type of masonry commonly used for bricks or building materials as known in the art. The blocks are preferably made of a dry cast concrete, but may also be made of wet cast concrete or precast concrete, if desired. One skilled in the art would recognize that any material may be used to construct the blocks that is substantially weatherproof, such as, for example, wood, rubber, plastic or glass or any other type of composite material. Hence, not only can the blocks be molded, but they could also be extruded, blow-molded, or any other known manufacturing process could be used.

It is to be seen that in various ones of the disclosed and illustrated versions and uses of the blocks, the blocks are identical to one another and are adapted to be interfitted with one another so that the joining portion of at least one block is perpendicular with the joining portion of another (an immediately adjoining) block and the side edge of at least one block is coplanar with the side edge of yet another block.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. An assembly of blocks for use in yard and garden environments comprising:
    a plurality of discrete blocks each comprising a body portion and a joining portion said body portion having a substantially planar top surface, said joining portion comprising a plurality of angled teeth extending from the body portion top surface, each of said teeth having a first surface and a second surface spaced from the first surface, the second surface extending from the top surface at an obtuse angle and the first surface extending from the top surface at an acute angle;
    wherein said teeth of a first one of said plurality of blocks interlock with said teeth of a second one of said plurality of blocks such that said first and second blocks can be connected together and arranged perpendicular relative to one another so that the plurality of blocks form an L-shaped configuration.

2. The assembly according to claim 1, wherein said angled teeth are defined by a plurality of notches in the joining portion.

3. The assembly according to claim 1, wherein each said block includes a first side edge and a second side edge, said first side edge having a first recess portion and a first projection, said second side edge having a second recess portion and a second projection.

4. The assembly according to claim 3, wherein said first side edge of the first one of said plurality of blocks interlocks with said second side edge of a third one of said plurality of blocks such that said first and third blocks can be connected together and disposed coplanar relative to one another.

5. The assembly according to claim 4, wherein said teeth of said second one of said plurality of blocks further interlock with said teeth of said third one of said plurality of blocks such that said second one of said plurality of blocks and said third one of said plurality of blocks can be connected together and arranged perpendicular relative to one another so that the plurality of blocks form an L-shaped configuration, said second one of said plurality of blocks being substantially centered between said first one and said third one of said plurality of blocks.

6. The assembly according to claim 1, wherein said first one of said plurality of blocks defines a base member.

7. The assembly according to claim 6, wherein said second one of said plurality of blocks defines a top member having a flat top surface.

8. The assembly according to claim 6, wherein said second one of said plurality of blocks defines a top member having a scalloped top surface.

9. The assembly according to claim 6, wherein said second one of said plurality of blocks defines a top member having a portico-shaped top surface.

10. The assembly according to claim 6, wherein said second one of said plurality of blocks defines a top member having a picket fence shaped top surface.

11. A method of assembling a plurality of blocks in a ground setting, comprising:
    providing a plurality of blocks, each of the blocks comprising a body portion and a joining portion said body portion having a substantially planar top surface, said joining portion comprising a plurality of angled teeth extending from the body portion top surface, each of said teeth having a first surface and a second surface spaced from the first surface, the second surface extending from the top surface at an obtuse angle and the first surface extending from the top surface at an acute angle, each said block further including a first side edge and a second side edge, said first side edge having a first recess portion and a first projection, said second side edge having a second recess portion and a second projection;
    positioning a first plurality of said blocks on the ground such that said first side edge of one of said plurality of blocks interlocks with said second side edge of another one of said plurality of blocks such that said blocks are connected together and arranged coplanar relative to one another;

positioning a second plurality of said blocks perpendicular to said first plurality of blocks on the ground such that said teeth of one of said second plurality of blocks interlock with said teeth of two of said first plurality of blocks such that said blocks are connected together and arranged perpendicular relative to one another.

12. The method according to claim 11, wherein the first plurality of blocks are positioned on the ground with an upper surface exposed above the ground and the second plurality of blocks extend upwardly away from the first plurality of blocks.

13. A landscape block comprising:
   a body portion having a first substantially planar longitudinal edge and a second longitudinal edge;
   a joining portion comprising a plurality of angled teeth disposed along and extending from said first longitudinal edge of said body portion, each of said teeth having a first surface and a second surface spaced from the first surface, the second surface extending from the first longitudinal edge at an obtuse angle and the first surface extending from the first longitudinal edge at an acute angle along said first longitudinal edge; and
   a first side edge and a second side edge, said first side edge having a first recess portion and a first projection, said second side edge having a second recess portion and a second projection.

14. The block according to claim 13, wherein said second longitudinal edge of said body portion defines a flat surface.

15. The block according to claim 13, wherein said second longitudinal edge of said body portion defines a scalloped surface.

16. The block according to claim 13, wherein said second longitudinal edge of said body portion defines a portico-shaped surface.

17. The block according to claim 13, wherein said second longitudinal edge of said body portion defines a picket fence shaped surface.

18. An assembly of blocks for use in yard and garden environments comprising:
   a plurality of discrete blocks each comprising a body portion and a joining portion, said joining portion comprising a plurality of angled teeth;
   wherein said teeth of a first one of said plurality of blocks interlock with said teeth of a second one of said plurality of blocks such that said first and second blocks can be connected together and arranged perpendicular relative to one another so that the plurality of blocks form an L-shaped configuration;
   wherein said angled teeth are defined by a plurality of notches in the joining portion;
   wherein each said block includes a first side edge and a second side edge, said first side edge having a first recess portion and a first projection, said second side edge having a second recess portion and a second projection;
   wherein said first side edge of the first one of said plurality of blocks interlocks with said second side edge of a third one of said plurality of blocks such that said first and third blocks can be connected together and disposed coplanar relative to one another; and
   wherein said teeth of said second one of said plurality of blocks further interlock with said teeth of said third one of said plurality of blocks such that said second one of said plurality of blocks and said third one of said plurality of blocks can be connected together and arranged perpendicular relative to one another so that the plurality of blocks form an L-shaped configuration, said second one of said plurality of blocks being positioned between said first one and said third one of said plurality of blocks.

19. The assembly according to claim 18, wherein said first one of said plurality of blocks defines a base member.

20. The assembly according to claim 19, wherein said second one of said plurality of blocks defines a top member having a flat top surface.

21. The assembly according to claim 19, wherein said second one of said plurality of blocks defines a top member having a scalloped top surface.

22. The assembly according to claim 19, wherein said second one of said plurality of blocks defines a top member having a portico-shaped top surface.

23. The assembly according to claim 19, wherein said second one of said plurality of blocks defines a top member having a picket fence shaped top surface.

* * * * *